United States Patent Office 2,976,118
Patented Mar. 21, 1961

2,976,118

METHOD OF PREPARING HYPOPHOSPHITES

René Pahud, Bex, Switzerland, assignor to La Fonte Electrique S.A., a corporation of Switzerland No Drawing. Filed Aug. 29, 1957, Ser. No. 680,912

Claims priority, application Switzerland Sept. 10, 1956

7 Claims. (Cl. 23—107)

In the method of preparing hypophosphites by treating phosphorus with a metal hydroxide and water it has already been proposed to give effect to the treatment by emulsifying the phosphorus in an aqueous solution of one or more metal hydroxides, particularly alkali metal hydroxides. This step substantially raises the velocity of the reaction of phosphorus, but the improvement is not sufficient to permit the reaction to be performed in a continuous process. As a matter of fact, when the phosphorus is emulsified in an alkaline solution the required contact time of the phosphorus in the said solution to give industrially useful yields of hypophosphites is not more than 1½ hours, whereas otherwise it is 20 hours. Nevertheless, a contact period of 1½ hours is still too long to permit the reaction to be maintained continuously because very considerable volumes of solution would be required and thus the apparatus would have to be of appreciable proportions. Moreover, the reaction components are explosive and toxic. It is therefore desirable to avoid an excessive accumulation of these materials and the employment of containers holding thousand of litres.

It has now been found that the reaction of phosphorus with metal hydroxides and water is catalysed by the saturated aliphatic alcohols, these latter compounds materially accelerating the velocity of this reaction. The contact times of the reagents can thus be reduced from 90 to about 15 minutes for the complete oxidation of the phosphorus to be performed.

An object of the present invention, which is based upon the above discovery, is therefore to provide a method of preparing hypophosphites by treating phosphorus with a metal hydroxide and water in which effect is given to said treatment in the presence of at least one saturated aliphatic alcohol.

The catalytic effect of the one or more of said alcohols is to raise the reaction velocity sufficiently to permit the performance of the process in continuous operation without the need of considerable apparatus.

The alcohols which serve as catalysts can be recovered by distillation when the oxidation reaction has been completed. They can then be returned to the continuous cycle.

It has been found that the catalytic effect of the alcohols increases with the number of carbon atoms they contain. An alcohol with which satisfactory results have been achieved is isoamyl alcohol, but even better results have been secured by using ethyl alcohol and isoamyl alcohol together. The quantity of alcohol required may be between 1 and 15 parts by volume of alcohol for each 100 parts by volume of phosphorus, metal hydroxide, and water combined.

Conveniently, but not necessarily, the phosphorus may be emulsified in the aqueous medium and the advantages resulting therefrom secured.

An illustrative example of the manner in which the proposed method of preparing hypophosphites of sodium may be performed will be hereinafter described.

The following quantities of reagents are continuously introduced in the course of one hour into a container holding 50 litres and equipped with a mechanical emulsifier:

| | Litres |
|---|---|
| Phosphorus (yellow) | 10 |
| A 200 g./litre standard solution of caustic soda | 105 |
| Milk of lime | 3.15 |
| Ethyl alcohol | 10 |
| Amyl alcohol | 5 |

By external cooling the temperature is maintained at 50° C. The mixture is then passed through three containers of 50 litres each placed the one above the other. In the final container the temperature is allowed to rise to 85° C. to decompose the phosphinic polymers. The solution is then freed of the catalyst alcohols by distillation. The distillate is recycled to the process.

After one hour's operation no more of the above mentioned alcohols need be introduced because the recycled alcohols will then be sufficient. For the purpose of continuous production the container need thereafter be charged only with the specified hourly quantities of phosphorus, caustic soda, and milk of lime. Over a period alcohol losses are, of course, compensated.

In this manner the following continuous yields are obtained:

+70% of the phosphorus introduced in the form of hypophosphite
−15% of the phosphorus as phosphite
−15% of the phosphorus as phosphate.

The method permits:

(1) Concentrated solutions to be obtained which reduce the expense of evaporation for preparing the crystalline product;

(2) The size of the apparatus required for a certain production to be reduced in the proportion of at least 1:20.

(3) Hypophosphite yields of over 70% of the phosphorus introduced to be obtained, whereas in the methods known to the art the yield hardly exceeded 50%;

(4) Continuous operation which reduces handling and overheads.

It will be understood that, other factors being equal, the method proposed by the invention will, on the one hand, considerably raise the hourly output with apparatus that is much smaller in size than that required in the performance of the conventional method of production and, on the other hand, sensibly improve the yield of hypophosphite obtained from the phosphorus introduced.

What I claim is:

1. A method of preparing a hypophosphite which consists of reacting, in admixture with a catalytic amount of a saturated aliphatic alcohol, yellow elemental phosphorus with water and a metal hydroxide selected from the group consisting of alkali metal hydroxides and alkaline earth metal hydroxides whereby a hypophosphite is formed.

2. A method as claimed in claim 1, in which the alcohol is isoamyl alcohol.

3. A method as claimed in claim 1, in which the alcohol is ethyl alcohol.

4. A method as claimed in claim 1, in which the alcohol used is recovered with a view to returning it to the cycle.

5. A method as claimed in claim 1, in which the proportion of alcohol used is between 1 and 15 parts by volume for each 100 parts by volume of phosphorus, metal hydroxide, and water, combined.

6. A method as claimed in claim 1, in which the phosphorus is emulsified in an aqueous solution of at least one metal hydroxide.

7. A method according to claim 1 wherein the saturated aliphatic alcohol is a mixture of ethyl alcohol and isoamyl alcohol.

References Cited in the file of this patent

UNITED STATES PATENTS 2,595,198     Lefforge et al. _____ Apr. 29, 1952

FOREIGN PATENTS 441,474     Great Britain _____ Jan. 20, 1936

OTHER REFERENCES

Concise Chemical and Technical Dictionary, Bennett, 1947, Chemical Publishing Co., Inc., page 726.

Mellor: Comprehensive Treatise on Inorganic and Theoretical Chemistry, vol. 8, 1928, pages 744–749.

Van Wazer: Phosphorus and its Compounds, vol. 1, 1958, Interscience Publishers; specifically pages 355–59.